Nov. 8, 1955  E. E. HESS  2,723,165
KNIFE EDGE BEARING CONSTRUCTION
Filed May 3, 1954

INVENTOR
E. E. Hess
BY
ATTORNEY

2,723,165
KNIFE EDGE BEARING CONSTRUCTION

Emerson Eugene Hess, Powell, Ohio

Application May 3, 1954, Serial No. 427,311

3 Claims. (Cl. 308—2)

This invention relates to bearings of the type utilized for the support of suspended structures, and, while not so limited in scope, is especially concerned with an improved low-friction bearing adaptable in pivotally suspending for free movement weight receivers or holders from the ends or mid-sections of pivotally movable beams of weighing scales.

In accurate weighing scales of the balance types, the pivoted beams or levers thereof usually carry a plurality of pivotally suspended weight receivers and rods or shafts extending to weighing platforms or other levers. It is important in scales of high sensitivity, such as those employed in counting the number of small parts in a given mass of such parts, as in taking inventories by resort to weighing operations, that the suspended weight receivers and steelyard rods, etc. should pivot freely within reasonable limits about their supports on the ends of the scale beams or levers and in all operating positions of the pivoted beams or levers the weight receivers shall hang truly vertically therefrom in a perpendicular manner. The ordinary yoke or bail constructions employed in such a capacity are apt to bind as a result of excessive friction between the same and the pivot pins, or other equivalent means, employed in movably securing the yokes or bails of the suspended weight receivers to the associated ends of scale beams or levers, thus causing error or delay in the operation of the scales.

It is, therefore, a principal object of this invention to provide an improved knife edge-type bearing connection having a low friction coefficient and employed for uniting a freely movable suspended weight receiver or other device from a pivoted beam or lever of an even or ratio balance weighing or counting scale, and formed to maintain the receiver in a truly pendant position in all working positions of the beam or lever.

Another object is to provide a bearing for use in capacity set forth which includes a pivot post projecting rigidly and longitudinally from one end of an associated scale beam and formed with a bearing disk having reversely tapered, wedge-shaped, circular surfaces merged to provide an annular knife edge formation at the periphery of the disk, and wherein said disk receives and is surrounded by an enlarged ring member formed with an internal annular groove for the reception of a point on the outer periphery of the knife edge of the disk, the groove having reversely tapered side walls which function to provide a point to point contact between the ring member and the bearing disk, whereby to enable the ring member and devices suspended therefrom to sway freely under conditions of low friction from the end or mid-section of an associated scale beam in maintaining the verticality of the suspended structure in all beam positions.

A further object is to provide a bearing structure of the character specified wherein the knife edge-suspended ring member is provided with an internal roller resting at all times on the inner periphery of the ring member opposite the knife edge disk, and wherein the roller includes a transverse axle pin which pivotally supports at the ends thereof a yoke element which may, for example, carry a rod or link extending to a weight receiver or weighing platform of an associated scale, or other lever.

Other objects are: to provide an improved bearing structure for oscillatory scale beams having the structural aims set forth, and wherein a disk formed with a knife edge periphery may be rotatably adjusted about the axis of an associated supporting member on which the disk is mounted, whereby to enable unworn portions of the disk periphery to be brought into contact with the associated ring member following predetermined use and resultant wear of the knife edge periphery; to provide a structure of this character in which a supporting beam-carried post or stud employed in the support and mounting of a knife edge bearing disk is adjustable longitudinally with respect to the end of an associated scale beam or lever carrying the post or stud, whereby to provide convenient means for regulating the center of the bearing structure, and a weight receiver suspended therefrom, with respect to the pivotal axis of turning movement of the scale beam or lever on its associated base; to provide a bearing structure of the type defined, wherein the included angle, represented by the reversely tapered outer circumferential surfaces of the disk component, is less than that formed between the reversely inclined surfaces of the annular seating groove formed in the inner circumference of the ring member, whereby to relatively space said tapered surfaces to provide for rocking movement of the ring member about the upper portion of the knife edge periphery of the pivot disk in enabling the bearing member and parts connected thereto to maintain substantially vertical positions regardless of the tilting of the disk member relative thereto; to provide in such bearing construction a roller having contact with and support on the inner circumferential surfaces of the ring member, the roller being formed with an annular peripheral groove in which is received a segment of the outer peripheral portion of the disk, whereby to effectively lock the parts of the bearing structure against relative lateral separation during normal operation of the bearing; and to provide a bearing structure for use in the capacities defined which is strong, simple and durable in construction and which requires but a minimum of attention in maintaining the same in proper working order.

For a further understanding of the invention, including additional objects and advantages thereof, reference is to be had to the following description and accompanying drawings, wherein.

Figure 1:
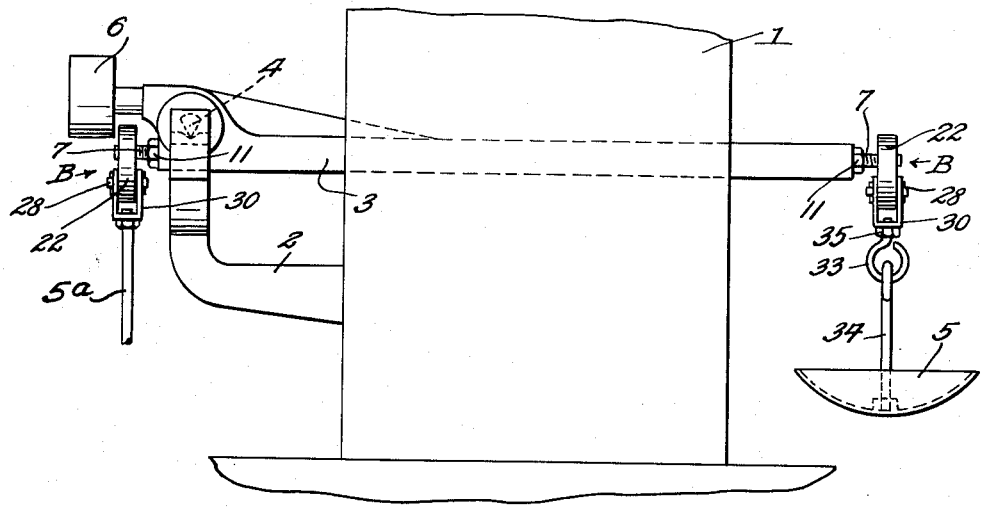
Fig. 1 is a side elevational view of a weighing scale employing a pivotally movable beam or lever, and wherein the ends of the beam or lever are provided with bearings formed in accordance with the present invention and utilized in the support of suspended weight receivers.

Referring to the drawings and to the structural details of the presently preferred form of my improved bearing illustrated therein, the numeral 1 designates a scale housing or frame which, in this instance, has been shown as including a stationary bifurcated bracket 2 upon which a beam or lever 3 is pivotally mounted adjacent to its inner end, as at 4. Each end of the lever or beam, as here shown, has connected thereto one of my improved bearings generally indicated at B. The beam or lever 3 may also be provided at its inner end with an adjustable balancing weight 6 of a type commonly employed in scales of the balanced beam type.

Associated with the bearing B connected with the outer end of the beam 3 is a weight receiver 5 which may, for example, be employed to receive given or known weights or quantities of articles. The bearing B, carried on the opposite or inner end of the beam 3, supports, for example, a depending rod or steelyard 5*a* to which may be connected a scale platform or unknown weight receiver, not shown, as is customary in scale operations of this kind. Also, it will be understood, that additional bearing assemblies and compensating weight receivers may be employed in association with the scale beam, if desired, depending upon the particular type or intended operation of the scale, it being the purpose of the drawings herein to illustrate only a single type of scale mechanism in connection with which my improved bearing may be used.

It is important in the operation of balanced beam scales that the parts thereof which are normally suspended from the beam be freely suspended in truly vertical positions in all operative positions of the beam, and that friction between the parts connecting such suspended members with the beam be held to a minimum upon oscillating movement of the beam. Toward this end, the present invention provides a sensitive, freely turning bearing structure admirably suited for use in scale construction of the foregoing type.

Each of the bearing assemblies B comprises a supporting post or stud 7 which may project longitudinally outwardly from the end of the lever or beam 3. The inner end of the post or stud may be received in a socket 8 formed therefor in the end of the beam or lever. To hold the post or stud in its associated socket, use may be made of a set screw 9 which is received in a threaded opening intersecting the socket. The inner end of the screw 9 frictionally presses on the inner end portion of the post or stud 7 to hold the latter against longitudinal displacement and loss of adjustment. Beyond the beam, the threaded shank 10 of the post receives a lock nut 11 which is adapted to be tightened against the end of the beam to move the post to an adjusted position within the socket 8. The inner end portion of the post or stud may be longitudinally flattened, as at 12, to provide a relatively broad surface for contact with the inner end of the associated set screw 9.

Figure 4:
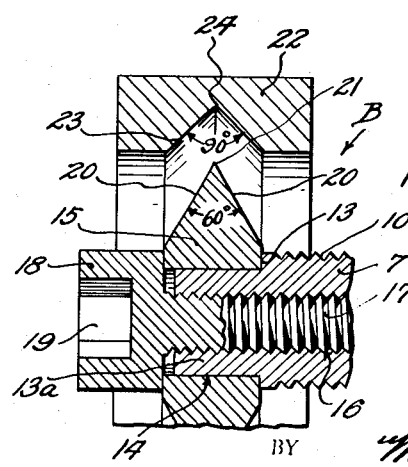
Fig. 4 is an enlarged fragmentary vertical sectional view taken through my improved bearing and showing the ring member thereof apart from the knife-edge disk to illustrate the relative angularity between the contacting portions of these members.

At its outer end, the post or stud 7 is shouldered, as at 13, by being reduced in diameter, thus providing on the outer end thereof a cylindrical smooth-surfaced extension 13*a* which is positioned in an opening 14 formed axially in an annular knife-edge bearing disk 15. The outer end of the post or stud 7 is formed with an internally threaded bore 16. The bore 16 receives the exteriorly threaded shank of a longitudinally extending binding screw 17. The screw 17 is formed at its outer end with an enlarged head 18, which, as shown in Fig. 4, is adapted to press frictionally against the outer side of the hub portion of the disk 15 to hold the latter firmly in a given rotatively adjusted position on the post 7. To facilitate loosening of the screws 17, the head 18 thereof is preferably formed with a multi-sided wrench-receiving recess or socket 19. The disk 15 is beveled on each side thereof to provide oppositely inclined, convergent, and circular outer side walls 20. The side walls 20 converge to provide a sharp annular knife edge 21 on the outer periphery of each disk. In this instance the included angle present between the tapering walls 20 is of the order of 60 degrees.

Figure 3:
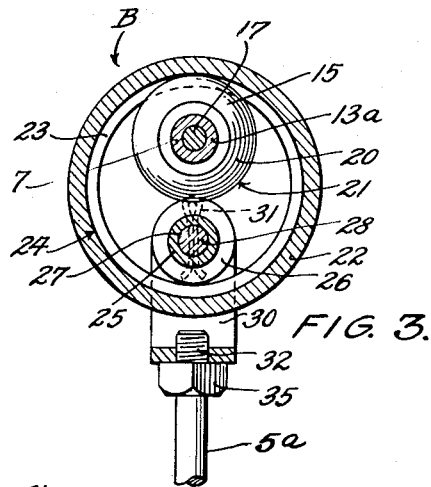
Fig. 3 is a vertical transverse sectional view taken on the line 3—3 of Fig. 2.

Seated upon the annular edge 21 of the disk is a ring member 22. This member, as shown in Fig. 3, possesses a substantially greater diameter than the disk 15 arranged therein. The inner surface of the ring member is grooved, as at 23. The walls of each of these grooves are reversely tapered in a radially converging manner and terminate in a narrow slightly arcuate peak surface 24 which is adapted to have direct contact with a point on the edge 21 of the associated disk 15. The tapered walls of each ring member are so relatively arranged that the included angle formed between them is greater than the included angle between the side surfaces 20 of the disk, and may be of the order of 90 degrees, so that there exists a substantial spacing of the adjacent tapered or inclined walls of the disk 15 and the adjacent walls 23 of the ring member, whereby to allow the latter a certain latitude of free swinging movement on the disk.

Figure 2:
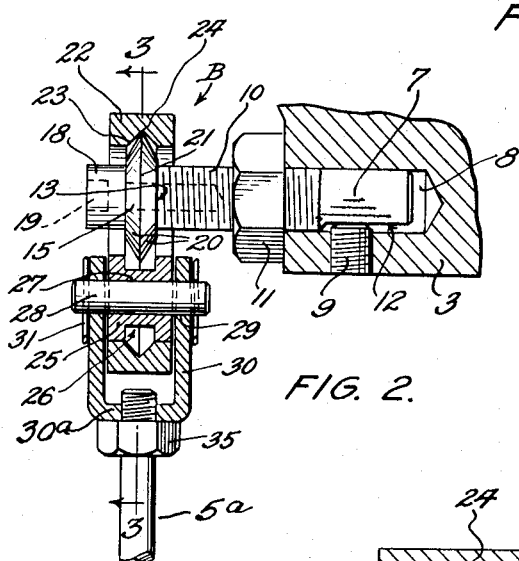
Fig. 2 is a fragmentary vertical sectional view taken through one end of a scale beam or lever and disclosing a bearing of the present invention carried thereby.

Positioned within the ring member 22, and disposed in seating contact with the inner circular wall thereof on each side of the annular groove 23 formed therein, is a collar or roller 25. In this instance the roller is formed with a continuous circular groove 26 in the periphery thereof. This groove, as shown in Fig. 2, is adapted to receive a segment of the outer edge region of the associated disk 15. Lateral swinging motion of each ring member on the edge of the disk is limited by the contacting of the associated disk with the walls of its complemental groove 26.

Extending through an axial bore 27 of the roller 25 is an axle pin 28. This pin is adapted to project equidistantly beyond the sides of the roller, so that the projecting ends of the pin may be received within aligned openings 29 formed in the spaced upper ends of a connector yoke 30. Cotter keys or the like 31 may pass through transverse openings formed in the projecting ends of the pin 28 to hold the pin and the yoke positioned in suspended order thereon against relative displacement. If desired, the cross web 30*a* of the yoke may be formed with a threaded opening for the reception of the threaded end of the rod 5*a*, or the threaded end of a shank 32 formed on an eye member 33, the latter being linked at the outer end of the beam with the hook-shaped upper end of the vertically and axially arranged stem 34 of the receiver 5 as shown in Fig. 1. Lock nuts 35 may advantageously be provided on the threaded portion of the rod 5 and shank 32 to lock these members firmly to the cross web 30*a* of the yokes 30.

While I have described my present improved bearing construction as used particularly in connection with weighing or counting scales, it should be understood that the bearing may be advantageously employed in connection with other entirely unrelated apparatus, devices or machines, and in substantially any capacity requiring or lending itself to the employment of a knife-edge type bearing for uniting two or more members to provide for relative rotational and lateral swinging movement therebetween. In this respect, it will be further understood that my improved bearing is not limited for use in suspending a relatively movable member from a relatively stationary member, but may be employed with equal facility where the relatively movable member extends upwardly or laterally from the stationary member, as well as downwardly therefrom.

In view of the foregoing, it will be seen that the present bearing structure provides an improved knife-edge bearing support which provides for relative rotation as well as limited swinging movement between two connected members, and at the same time is characterized by a minimum of friction in its operation, and its ability to provide a positive lock between the separate components of the bearing. Furthermore, the present bearing construction, by reason of the substantially point to point contact between its relatively movable components, may be adjusted to minimize wear, and consequent friction, simply by adjusting the relatively rotatable knife-edge disk member to vary the point of contact thereof with the associated ring or collar member.

While I have described and illustrated my improved knife-edge type bearing in a single preferred form, it will be understood the same is subject to modification as to details of construction or design without departing from the spirit of the invention or the scope of the following claims.

I claim:

1. A bearing comprising a relatively stationary disk member formed on its periphery with a circular knife edge; a ring member of greater diameter than said disk having an internal annular groove to receive a segment of the outer peripheral edge of said disk member; a roller positioned in said ring opposite said disk and being formed with a peripheral groove in which a diametrically opposed edge segment of said disk is disposed, said roller serving to lock said disk member and said ring member against axial separation; axle means extending through said roller; and connector means joined with the respective ends of said axle means and holding said roller within said ring.

2. A bearing comprising a support-carried disk member, said disk member having oppositely inclined V-shaped circular surfaces converging at the periphery of said disk member and defining thereon a circular knife edge; a ring member of greater diameter than said disk and within the confines of which said disk is arranged, said member being formed with an internal annular groove of V-shaped cross-section in which a segment of said disk is received to support the ring member for swaying movement in a plane transverse to that of the disk, the included angle between the walls of said groove being greater than the included angle between the V-shaped surfaces of said disk to permit a point on the outer periphery of said disk to bottom in said groove; a roller mounted in said ring member in diametrically opposed relation to said disk, said roller being formed with a peripheral groove to receive a segment of said disk opposite the point of its contact with said ring member; and means connected with said roller to maintain the same within said ring and for connecting a relatively movable support thereto.

3. A suspension bearing construction comprising a support; a post carried by said support; a generally vertically arranged disk mounted for rotational adjustment on and about the longitudinal axis of said support, said disk being formed peripherally with reversely tapered surfaces converging to a circumferential knife-edge formation; a ring having an internal diameter greater than said disk and arranged to be positioned on the knife-edge formation of said disk, said ring having an inner surface annularly grooved, the walls of said groove being reversely tapered to provide a wider included angle than the tapered surfaces defining the peripheral edge of said disk to space said surfaces relatively and thereby to permit of transverse rocking movement of the ring member on its point contact with the circular knife edge formation of said disk, a roller carried in said ring member opposite said disk, said roller being peripherally grooved for the reception of a segment of the peripheral portion of said disk; an axle pin extending longitudinally through said roller and projecting beyond the sides of said ring member; a yoke member having spaced legs formed with openings for the reception of the ends of said axle pin; and a load-bearing structure pivotally suspended from said yoke.

References Cited in the file of this patent

UNITED STATES PATENTS

| | | |
|---|---|---|
| 1,470,042 | Wolf | Oct. 9, 1923 |
| 2,106,966 | Binckley | Feb. 1, 1938 |